Figures 1, 2, 3, 4:
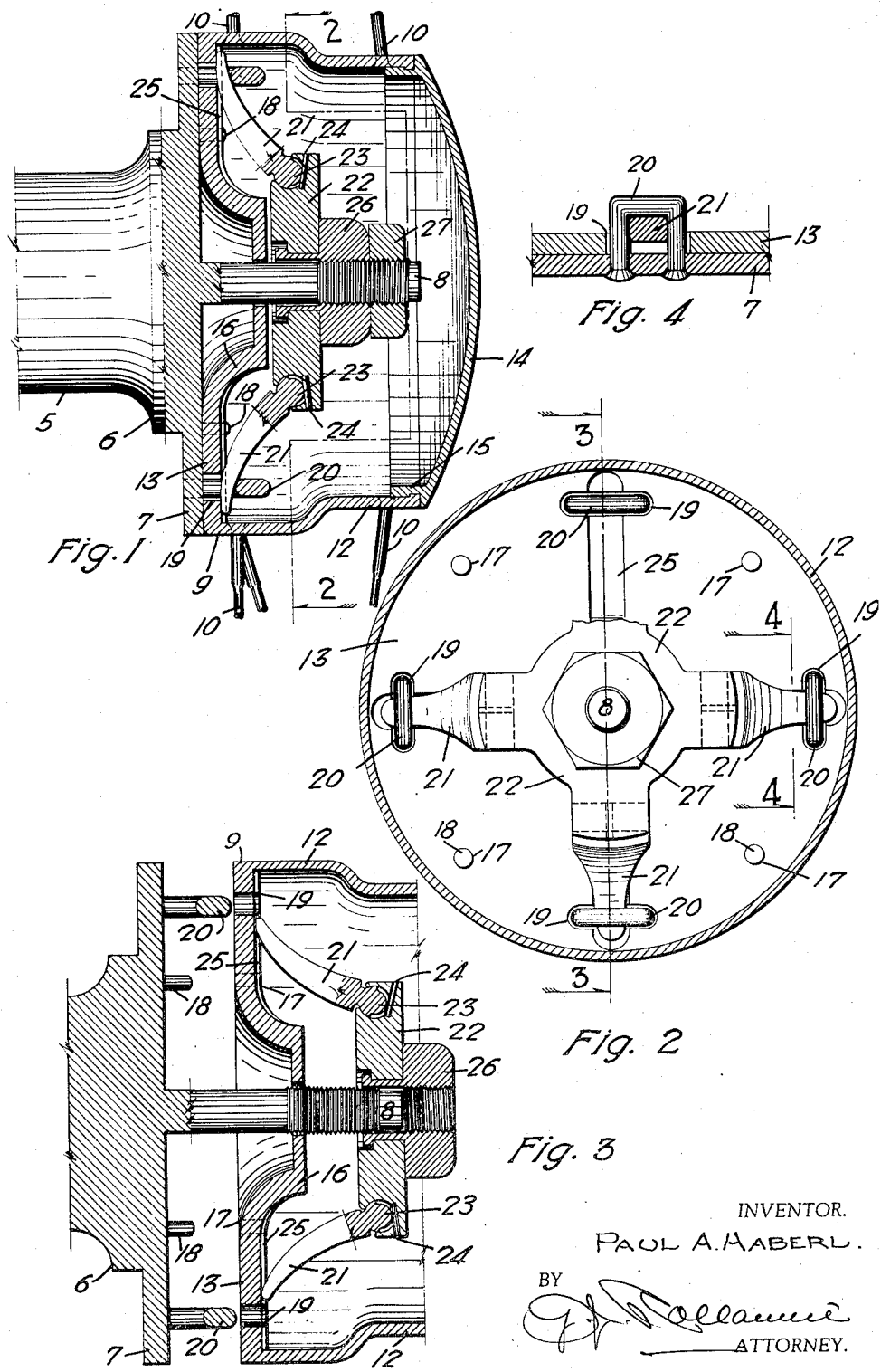

Feb. 4, 1936. P. A. HABERL 2,029,866

DEMOUNTABLE WHEEL

Filed Oct. 29, 1934

INVENTOR.
PAUL A. HABERL.
BY
ATTORNEY.

Patented Feb. 4, 1936

2,029,866

UNITED STATES PATENT OFFICE 2,029,866

DEMOUNTABLE WHEEL

Paul A. Haberl, Denver, Colo.

Application October 29, 1934, Serial No. 750,479

14 Claims. (Cl. 301—9)

This invention relates to demountable wheels and its primary object is to provide a simple, efficient and practical mechanism for locking a wheel of the general type used on motor driven vehicles, upon its axle for rotation therewith.

Another object is to provide a mechanism of the above stated character which is adjustable to a position in which the wheel is detachable from its axis, by a simple operation such as that involved in loosening a nut by means of a wrench or other suitable tool.

A further object is to provide a mechanism in which the locking mechanism is readily accessible upon removal of the hub-cap of the wheel.

Another object is to provide a mechanism of the above described character which is mounted upon an axial extension of the axle, and still further objects reside in details of construction and in a novel and advantageous arrangement of parts as will be brought out in the course of the following description.

In the accompanying drawing, in the several views of which like parts are similarly designated, Figure 1 represents a sectional elevation of my invention as applied to a wheel of the demountable type, and the axle upon which it is mounted, Figure 2 is a section taken along the line 2—2 of Figure 1, Figure 3 is a sectional view similar to that of Figure 1, but with the wheel, the axle and the elements comprised in the mechanism by which they are connected for conjunctive rotation, in a separated position, and Figure 4 is a fragmentary section taken on the line 4—4 of Figure 2.

Referring further to the drawing, the axle 5 has a head 6 upon which the wheel is mounted. The head 6 includes a face plate 7 and an axial extension in the form of a screw-threaded stud 8 upon which in practice, the locking mechanism of the present invention is operatively supported.

The demountable wheel is represented by a hollow hub 9, and spokes 10 which connect the rim of the wheel, not shown in the drawing, in coaxial relation thereto.

The hub comprises a circumferential wall-member 12 projecting from an end plate 13. A cap 14 is detachably fastened upon the end of the hub opposite to its end-plate, and the parts thus assembled provide a dust-proof housing for the locking mechanism of the present invention, hereinafter to be described.

The cap 14 may be sprung inside the end of the wall-member of the hub by means of a flexible flange as shown at 15 in the drawing, or it may be attached for ready removal by any other suitable means and in any convenient manner.

The end-plate 13 of the wheel-hub has a central inwardly extending boss 16 provided with a central opening to admit the axial extension or stud 8 of the axle. The plate has a concentric series of equidistant holes 17 to receive dowel pins 18 projecting from the face-plate of the axle, and exteriorly of said series of holes, is a concentric series of equidistantly spaced slots 19, through which, in practice, extend a plurality of U-shaped lugs 20 which are a part of the locking mechanism hereinafter to be described. The lugs and the dowel pins on the axle head cooperate in holding the hub of the wheel against relative rotation and they may be formed on or connected with the head in any suitable manner.

In Figure 4 of the drawing, the U-shaped lugs have been shown with their legs fittted in apertures of the face-plate of the axle-head and riveted at the ends of the legs, the connection being further secured by welding or the like.

The end-plate 13 and the circumferential wall 12 of the hub may be formed integrally of one piece of metal as shown in the drawing or the two parts may be made separately and then integrally connected by welding or other means.

The parts of the lugs 20 projecting through their respective slots 19 into the hollow hub, provide sockets to receive the ends of curved and wedge-shaped dogs 21 of the locking mechanism, pivotally mounted upon a follower 22 which is slidably supported on the stud 8 of the axle.

The pivotal connection of the dogs with the follower may be established through the medium of rounded heads 23 on the dogs rotatably fitted in correspondingly formed sockets of the follower, pins 24 on the latter, engaging in grooves of the heads to hold the dogs against lateral displacement.

The dogs extend radially with relation to the follower and the stud upon which the latter is mounted, and radial grooves 25 formed in the inner surface of the end-plate 13 of the hub, guide the dogs into and out of their respective sockets formed by the projecting portions of the U-shaped lugs.

A drive-nut 26 screwed upon the threaded stud, is swiveled in the central opening of the follower, and a lock nut 27 likewise screwed upon the stud in engagement with the drive-nut, holds the latter against accidental displacement by jars or vibration due to the rotary movement of the wheel with the axle on which it is mounted.

Having thus described my invention with respect to the construction and cooperative arrangment of its constituent elements, its operation will be readily understood.

When the hub of the wheel is placed against the face-plate of the axle head it is held against relative rotation by the dowel pins 18 and the lugs 20 and the latter projecting inside the hub provide sockets into which the dogs 21 are driven by movement of the follower 22 on the stud 8 of the axle, impelled by rotation of the nut 26 on the screw-threaded end-portion of the stud through the medium of a wrench or other suitable tool. The dogs are guided into their respective sockets by the grooves 25 on the inner surface of the end-plate of the hub and owing to their curved and wedge-like form they lock the hub in rigid connection with the head of the axle, by pressure, exerted upon the end-plate of the hub as they advance into the sockets.

The lock nut 27 driven home against the driving nut, prevents accidental loosening of the locking mechanism and it will be apparent that by turning the nuts in opposite directions the dogs may be disengaged from their sockets, as easily as they were driven into the same.

When the dogs are removed from the sockets, the nuts and the follower may be removed from the stud, leaving the wheel free to be dismounted from the axle.

The hollow wheel-hub with its cap in place provides a dust proof housing for the locking-mechanism, and when the cap is removed, the parts of the mechanism are readily accessible for adjustment, removal and replacement.

The absence of springs and other derangeable parts is a distinctive feature of the invention and its simplicity and strength of construction assures durability and practicability in use.

Having thus described my invention, I desire it understood that the construction and arrangement of the various parts comprised therein may be modified without departing from the spirit and scope of the invention as defined in the hereunto appended claims.

What I claim and desire to secure by Letters Patent is:

1. A demountable wheel comprising in combination with a rotary element having an axial extension and a series of socketed lugs, a hub-member having an end-plate apertured to admit the socketed lugs, a follower movable on the extension, dogs carried by the follower and cooperating with the socketed lugs to rigidly connect the hub-member to the rotary element, and a driving-element acting upon the follower, and adapted to hold it in an adjusted position in which the dogs are in operative relation to the lugs.

2. A demountable wheel comprising in combination with a rotary element having an axial, screw-threaded extension and a series of socketed lugs, a hub-member having an end-plate apertured to admit the socketed lugs, a follower movable on the extension, dogs carried by the follower and cooperating with the socketed lugs to rigidly connect the hub-member to the rotary element, and a nut on the screw-threaded extension acting upon the follower to drive the dogs into operative relation to the lugs.

3. A demountable wheel comprising in combination with a rotary element having an axial, screw-threaded extension and a series of socketed lugs, a hub-member having an end-plate apertured to admit the socketed lugs, a follower movable on the extension, dogs carried by the follower and cooperating with the socketed lugs to rigidly connect the hub-member to the rotary element, and a nut on the screw-threaded extension, swiveled on the follower to move the dogs to and from operative relation to the lugs.

4. A demountable wheel comprising in combination with a rotary element having an axial extension and a series of socketed lugs, a hub-member having an end-plate apertured to admit the socketed lugs, a follower movable on the extension, dogs pivoted on the follower and cooperating with the socketed lugs to rigidly connect the hub-member to the rotary element, and a driving-element acting upon the follower, and adapted to hold it in an adjusted position in which the dogs are in operative relation to the lugs.

5. A demountable wheel comprising in combination with a rotary element having an axial screw-threaded extension and a series of socketed lugs, a hub-member having an end-plate apertured to admit the extension and the socketed lugs, a follower movable on the extension, pivoted dogs on the follower riding upon the end-plate and cooperating with the socketed lugs to rigidly connect the hub-member to the rotary element, and a nut on the screw-threaded extension acting upon the follower, to drive the dogs into operative relation to the lugs.

6. A demountable wheel comprising in combination with a rotary element having an axial screw-threaded extension and a series of socketed lugs, a hub-member having an end-plate apertured to admit the extension and the socketed lugs, a follower movable on the extension, pivoted wedge-shaped and curved dogs on the follower riding upon the end-plate and cooperating with the socketed lugs to rigidly connect the hub-member to the rotary element, and a nut on the screw-threaded extension acting upon the follower, to drive the dogs into operative relation to the lugs.

7. A demountable wheel comprising in combination with a rotary element having an axial screw-threaded extension and a series of socketed lugs, a hub-member having an end-plate apertured to admit the extension, and the socketed lugs, a follower movable on the extension, pivoted dogs on the follower riding upon the end-plate and cooperating with the socketed lugs to rigidly connect the hub-member to the rotary element, the end-plate having grooves to guide the dogs toward the lugs, and a nut on the screw-threaded extension acting upon the follower, to drive the dogs into operative relation to the lugs.

8. A demountable wheel comprising in combination with a rotary element having an axial screw-threaded extension and a series of socketed lugs, a hollow hub-member open at one end and having an end-plate apertured to admit the extension and the socketed lugs, a follower movable on the extension, pivoted dogs on the follower riding upon the end-plate and cooperating with the socketed lugs to rigidly connect the hub-member to the rotary element, and a nut on the screw-threaded extension, accessible through the open end of the hub-member and acting upon the follower, to drive the dogs into operative relation to the lugs.

9. A demountable wheel comprising in combination with a rotary element having an axial screw-threaded extension and a series of socketed lugs, a hub-member having an end-plate apertured to admit the extension and the socketed lugs, dowel pins providing a rotative connection between the rotary element and the hub-member, a follower movable on the extension, pivoted dogs on the follower riding upon the end plate and cooperating with the socketed lugs to rigidly connect the hub-member to the rotary element, and a nut on the screw-threaded extension acting upon the follower, to drive the dogs into operative relation to the lugs.

10. A demountable wheel comprising in combination with a rotary element having an axial exteriorly screw-threaded extension and a concentric series of socketed lugs, a hub-member having an end-plate provided with a central inwardly extending boss apertured to admit the extension, and having around said boss a concentric series of apertures to admit the socketed lugs, a follower movable on the extension, dogs pivoted to the follower bearing upon the end-plate and cooperating with the lugs to rigidly connect the hub-member to the rotary element, and a nut on the extension, acting upon the follower to drive the dogs into operative relation to the lugs.

11. A structure of the character described, comprising a rotary shaft having a face plate, and having an axial exteriorly screw-threaded extension and socketed lugs, all projecting from the face of the plate, a hollow hub-member having an end-plate engaging the face of the head and apertured to admit the extension and the lugs, a follower movable on the extension, dogs pivoted to the follower bearing upon the end-plate and cooperating with the lugs to rigidly connect the hub-member to the face plate, and a nut on the extension, acting upon the follower, to drive the dogs into operative relation with the lugs.

12. A structure of the character described, comprising a rotary shaft having a faced head, and having an axial screw-threaded extension, dowel pins and socketed lugs, all projecting from the face of the head, a hollow hub-member having an end-plate engaging the face of the head and apertured to admit the extension, the dowel pins and the lugs, a follower movable on the extension, pivoted dogs on the follower bearing upon the end-plate and co-operating with the lugs to rigidly connect the hub-member to the rotary element, and a nut on the extension, acting upon the follower, to drive the dogs into operative relation with the lugs.

13. A demountable wheel, comprising in combination with a rotary element provided with socketed lugs, a hub member having an end plate apertured to admit the lugs, an assembly of dogs cooperating with the lugs to rigidly connect the hub member with the rotary element, and an element in operative connection with the rotary element and movable toward the same for driving the assembly of dogs into operative relation to the lugs.

14. A demountable wheel comprising in combination with a rotary element provided with socketed lugs, a hub member having an end plate apertured to admit the lugs, an assembly of dogs cooperating with the lugs to rigidly connect the hub member with the rotary element, and an element in operative connection with the rotary element and movable toward the same for driving the assembly of dogs into operative relation to the lugs, and effective for holding the assembly of dogs against movement relative to the lugs upon termination of its movement.

PAUL A. HABERL.